United States Patent
Schlosser et al.

(10) Patent No.: US 7,735,856 B2
(45) Date of Patent: Jun. 15, 2010

(54) AIR-BAG

(75) Inventors: Jutta Schlosser, Achern (DE); Ernst Wittmann, Hebertshausen (DE)

(73) Assignee: Autoliv Development AB, Vargarda (SE)

( * ) Notice: Subject to any disclaimer, the term of this patent is extended or adjusted under 35 U.S.C. 154(b) by 672 days.

(21) Appl. No.: 10/562,870

(22) PCT Filed: Jun. 17, 2004

(86) PCT No.: PCT/SE2004/000972

§ 371 (c)(1), (2), (4) Date: May 8, 2006

(87) PCT Pub. No.: WO2005/000639

PCT Pub. Date: Jan. 6, 2005

(65) Prior Publication Data

US 2006/0232054 A1    Oct. 19, 2006

(30) Foreign Application Priority Data

Jun. 30, 2003    (GB)    .................... 0315270.9

(51) Int. Cl.
    B60R 21/207    (2006.01)
    B60R 21/23    (2006.01)
(52) U.S. Cl. ................. 280/730.2; 280/743.2
(58) Field of Classification Search ................. 280/729, 280/730.2, 743.1, 743.2
    See application file for complete search history.

(56) References Cited

U.S. PATENT DOCUMENTS

| | | | |
|---|---|---|---|
| 5,478,114 A | 12/1995 | Maurer et al. | |
| 5,676,395 A | 10/1997 | Oe et al. | |
| 5,692,774 A * | 12/1997 | Acker et al. | ................. 280/729 |
| 5,718,450 A * | 2/1998 | Hurford et al. | ........... 280/730.2 |
| 5,730,464 A | 3/1998 | Hill | |
| 5,791,685 A * | 8/1998 | Lachat et al. | ............ 280/743.1 |
| 5,848,804 A * | 12/1998 | White et al. | ............. 280/743.1 |
| 5,853,191 A * | 12/1998 | Lachat | ..................... 280/730.2 |
| 5,924,722 A * | 7/1999 | Koide et al. | ............... 280/730.2 |
| 6,168,191 B1* | 1/2001 | Webber et al. | ........... 280/730.2 |
| 6,364,348 B1* | 4/2002 | Jang et al. | ................. 280/730.2 |
| 6,422,593 B1 | 7/2002 | Ryan | |
| 6,478,329 B1* | 11/2002 | Yokoyama | ................... 280/729 |
| 7,431,332 B2* | 10/2008 | Wipasuramonton et al. | ...................... 280/730.2 |
| 2001/0042974 A1* | 11/2001 | Sasaki et al. | ............. 280/728.2 |
| 2002/0146949 A1 | 10/2002 | Keshavaraj | |

(Continued)

FOREIGN PATENT DOCUMENTS

DE    102 46 769 A1    4/2004

(Continued)

*Primary Examiner*—Paul N. Dickson
*Assistant Examiner*—George D. Spisich
(74) *Attorney, Agent, or Firm*—Brinks Hofer Gilson & Lione

(57) ABSTRACT

A side air-bag for use in a motor vehicle is disclosed. The side air-bag is formed from two superimposed layers (1) of a laminar material such as fabric. Each layer (1) has a leading edge (3) and a trailing edge (4). The air-bag includes at least one internal tether (8) which extends from the leading edges (3) to the trailing edges (4), with the length d of the tether being less than the width D of the elements (1) forming the airbag between the leading edge (3) and a trailing edge (4) at a point where the tether (8) is positioned.

8 Claims, 2 Drawing Sheets

U.S. PATENT DOCUMENTS

| | | |
|---|---|---|
| 2003/0168836 A1 | 9/2003 | Sato et al. |
| 2005/0104342 A1* | 5/2005 | Jackson et al. ........... 280/730.2 |
| 2007/0216142 A1* | 9/2007 | Honda et al. ............. 280/730.2 |
| 2007/0267856 A1* | 11/2007 | Schedler .................. 280/743.2 |

FOREIGN PATENT DOCUMENTS

| | | |
|---|---|---|
| EP | 0 940 302 A1 | 9/1997 |
| JP | 2002-514147 | 5/2002 |
| JP | 2003-335209 | 11/2003 |
| JP | 2004-189187 | 7/2004 |
| WO | 98/12077 | 3/1998 |
| WO | WO 00/15472 | 3/2000 |
| WO | WO 03/008234 A2 | 1/2003 |

* cited by examiner

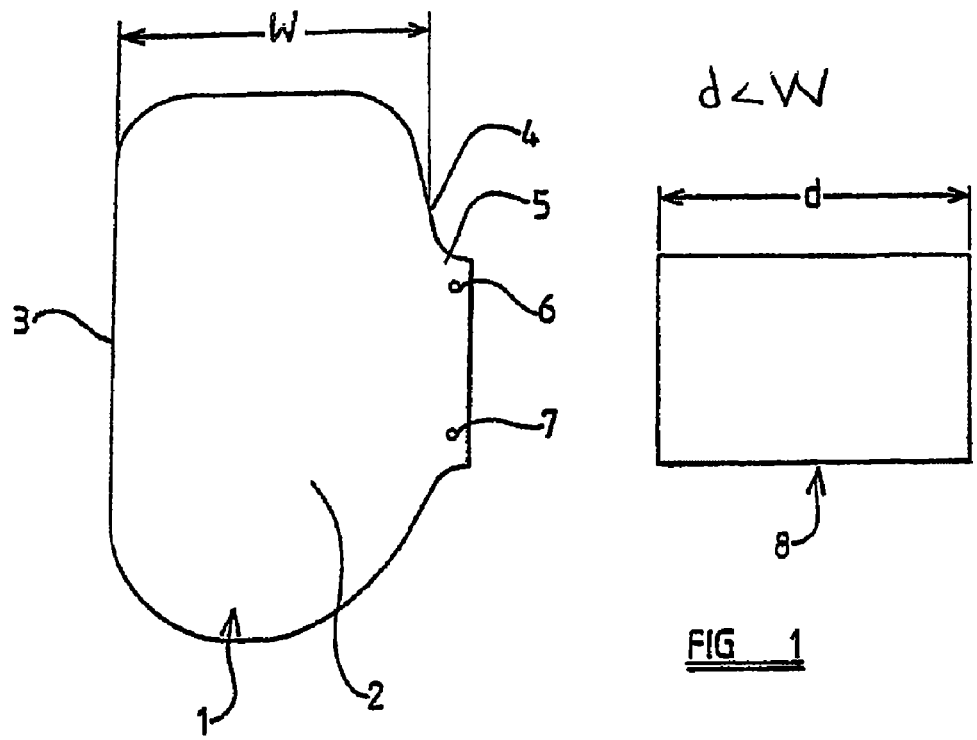
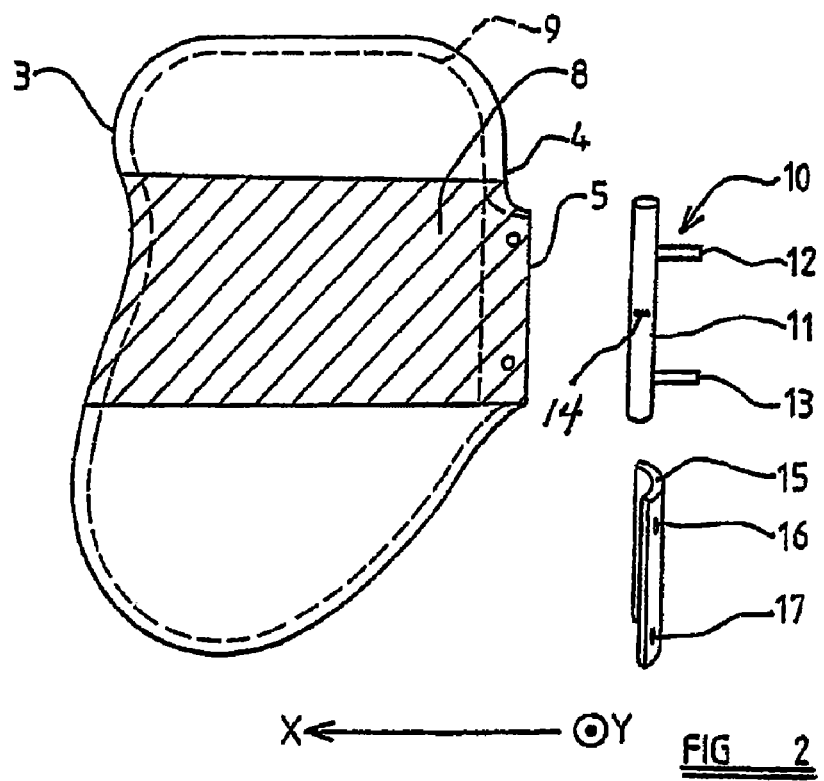

AIR-BAG

CROSS REFERENCE TO RELATED APPLICATIONS

This application claims priority to Great Britain patent application number 0315270.9, filed Jun. 30, 2003, and PCT/SE2004/000972, filed Jun. 17, 2004.

BACKGROUND

1. Field of the Invention

The present invention relates to an air-bag for use in a vehicle such as a motor car and more particularly relates to a side air-bag.

2. Description of Related Art

A side air-bag may be mounted in position, for example, in the backrest of a vehicle seat or in part of the side wall or a side door of the motor vehicle. The air-bag being configured, when inflated, to be located between the occupant of a seat and the adjacent side of the vehicle.

A side air-bag may prove to be of particular benefit in a side impact situation. However, in a side impact situation an intruding vehicle or object can, even at relatively low speeds, impact with an occupant of the vehicle very shortly after the impact situation has commenced, and consequently it is desirable to be able to inflate a side air-bag in the minimum amount of time. Consequently, it is desirable to be able to inflate the side air-bag using a minimum quantity of gas.

However, it is also desired that a side air-bag should be as thick or "deep" as possible in the transverse direction across the vehicle, in order to provide the maximum cushioning effect for the occupant of the vehicle relative to an intruding vehicle or object.

In view of the above, it is apparent that there exists a need for a side air-bag which can be inflated quickly using a minimum quantity of gas, but which has a relatively high thickness or "depth."

SUMMARY OF THE INVENTION

In satisfying the above need, as well as overcoming the enumerated drawbacks and other limitations of the related art, the present invention provides an improved side air-bag.

According to the present invention, there is provided a side air-bag for use in a motor vehicle, the side air-bag being formed from two superimposed layers of a laminar material, each layer having a leading edge and a trailing edge, there being at least one internal tether having opposed ends connected to the leading edge and the trailing edge, the length of the tether between the connections being less than the width of the layers forming the air-bag between the connections.

Preferably when the side air-bag is mounted in the motor vehicle, the or each tether is configured to extend in a direction substantially parallel to the longitudinal axis of the motor vehicle when the air-bag is inflated.

Advantageously there is a single tether.

Conveniently there are at least two tethers at spaced apart positions.

Preferably the air-bag is divided into two separate internal inflatable chambers by means of a seam interconnecting the layers of laminar material.

Advantageously the width of each layer of laminar material at the point where the tether is provided is W and the length of the or each tether is d, wherein $d < 2W/\pi$.

BRIEF DESCRIPTION OF THE DRAWINGS

In order that the invention may be more readily understood, and so that further features thereof may be appreciated, embodiments of the invention will now be described, by way of example, with reference to the accompanying drawings in which:

FIG. 1 is a plan view illustrating two components for forming an air-bag;

FIG. 2 is a view of an air-bag formed from the components of FIG. 1 illustrating an additional gas generator and deflector;

DETAILED DESCRIPTION OF THE INVENTION

Figure 3:
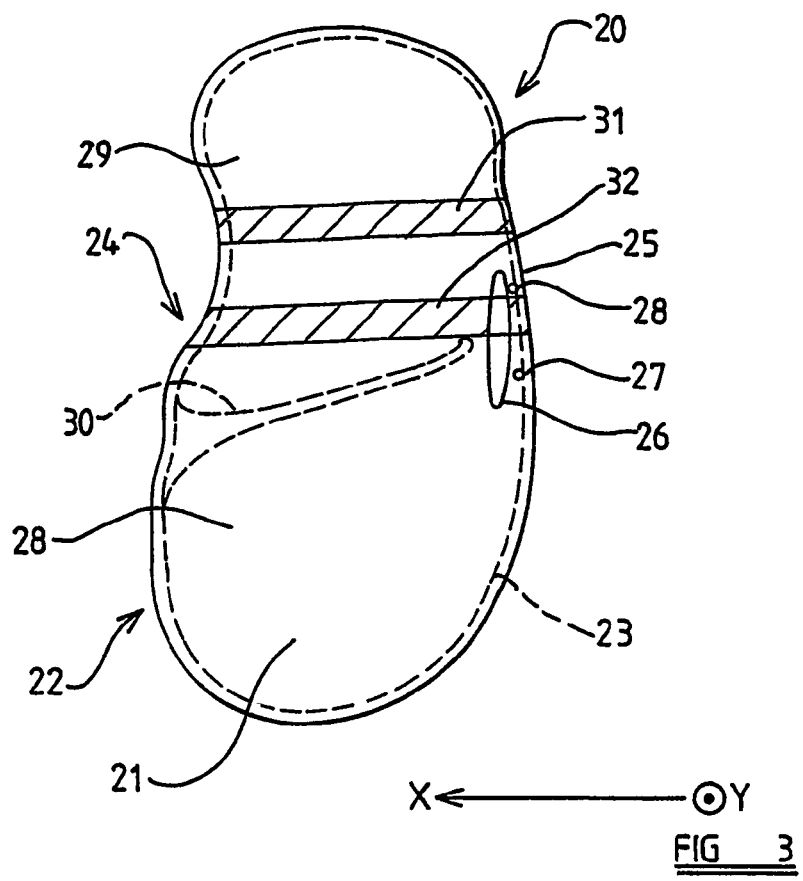
FIG. 3 is a view of a modified embodiment to the invention.

Referring initially to FIG. 1 of the accompanying drawings, an element 1 of flexible laminar material such as fabric, is illustrated. It is to be understood that two pieces of the shape and form of the element 1 are to be superimposed and joined together to form an air-bag. Alternatively a single piece of appropriate shape may be folded about a fold line to provide the two superimposed elements.

The element 1 has a central substantially rectangular region 2 with rounded corners. The rectangular region 2 has a leading or forward edge 3 and a trailing or rearward edge 4. The forward edge 3 forms that part of the air-bag which will be towards the front of the vehicle when the air-bag is in position in the vehicle and inflated, and the rearward edge 4 is the edge of the air-bag which will be towards the rear of the vehicle when the air-bag is in position in the vehicle and inflated.

The rearward or trailing edge 4 is provided with a rearwardly projecting portion 5 located substantially at its mid point. The projecting portion 5 is provided with two apertures 6, 7 therein at spaced apart positions.

The overall width of the element 1, from the leading edge 3 to the trailing edge 4 is a width W.

A further component is illustrated in the form of a tether 8. The tether 8 is a rectangular element of flexible laminar material such as fabric. The element has a length d, the length d being such that, preferably, $d < 2W/\pi$.

In fabricating an air-bag, two elements such as the element 1 are superimposed, with a tether 8 inserted between them. The two superimposed elements are interconnected by means of a peripheral seam 9 as shown in FIG. 2 which extends around the periphery of the superimposed elements 1 except for the region at the end of the rearward projection 5 formed in the trailing edge 4 of the superimposed layers. The internal tether 8 is secured, adjacent the rearward projection 5, to at least one of the elements 1 by the seam 9, which may be stitched or formed using some other technique. A portion of the leading or forward edge 3 of each element 1 is gathered slightly back towards the trailing edge 4 during fabrication 16 the air-bag so that the forwardmost edge of the tether 8 may be trapped within the seam 9 adjoining the leading or forward edge 3 of the elements 1. The two elements 1, at least in the region of the tether 8, will be wrinkled and will not lie flat. It is to be understood that the width of the fabric of the elements 1 between the points at the leading and trailing edge (3, 4), where the tether 8 is secured to the fabric, is greater than the length of the tether 8 between the points, which means that some wrinkles or folds must be present in the fabric.

A cylindrical gas generator 10 may be provided to be mounted within the air-bag, the gas generator 10 having a cylindrical body 11 with two parallel and radially extending studs 12, 13. The cylindrical body 11 may be provided with gas outlet apertures 14. In conjunction with the gas generator 10, a protecting element or gas diffuser 15 may be provided, the protecting element 15 being of open-channel-form and being provided with two apertures 16, 17 located and configured to receive the studs 12, 13. The protector 15 may be mounted on the studs 12, 13 of the gas generator 10 to form a gas generator unit and the thus-assembled gas generator unit may be inserted into the air-bag through the opening formed by the un-connected peripheral parts of the superimposed elements 1 in the region of the co-aligned rearward projections 5. When the gas generator unit has been inserted into the air-bag, the studs 12, 13 may be passed through the apertures 6, 7 in each of the projections 5, thus effectively sealing the air-bag.

The air-bag, as thus described, may be mounted in a motor vehicle at a suitable position for the air-bag to act as a side air-bag, and thus the air-bag may be mounted in the backrest of a vehicle seat or in part of the side wall of the vehicle adjacent a vehicle seat.

On deployment of the air-bag, gas from the gas generator 10 will be injected into the air-bag. The effect of the tether 8 will be to prevent the forward or leading edge 3 of the air-bag from moving a substantial distance in the x direction (or main longitudinal axis) of the motor vehicle (as indicated in FIG. 2) from the rear or trailing edge 4, thus forcing the air-bag to adopt a pre-determined shape on inflation. It should be appreciated that the x-direction is the direction of forwards travel of the motor vehicle. In the absence of an internal tether, such as the tether 8, the air-bag, if sufficient gas is injected into it, would tend to adopt a generally cylindrical format. However, in view of the presence of the tether, the leading or forward edge 3 of the air-bag cannot move sufficiently far away from the rear or trailing edge 4 in the x direction to form a cylinder, but instead the air-bag is inflated to have a very substantial thickness or depth in the orthogonal y-direction (transverse with respect to the longitudinal axis of the motor vehicle), whilst not extending very far forwards relative to the gas generator. The y-direction is shown in FIG. 2 extending out of the page. The air-bag thus provides an optimum dimension in the direction where energy is to be absorbed.

FIG. 3 illustrates a modified embodiment of the invention. FIG. 3 shows a complete air-bag 20 which is formed from two substantially identical superimposed elements 21, 22, of flexible laminar material such as fabric, although the air-bag 20 could be formed using a one piece weaving technique. The air-bag 20 is provided with a peripheral outer seam 23 interconnecting the elements 21, 22, and presents a leading edge 24 and a trailing edge 25 in a similar manner to the above-described embodiment of FIGS. 1 and 2. The trailing edge 25 of the air-bag 20 is provided with a slit or opening 26 through which a gas generator may be inserted into the interior of the air-bag. The air-bag 20 is also provided with two spaced apart apertures 27, 28 adjacent the slit 26, which are dimensioned to accommodate the studs of a gas generator assembly, equivalent to the studs 12, 13 of the gas generator 10 described with reference to FIG. 2.

The air-bag 20, in the described embodiment, is divided into two separate internal inflatable chambers 28, 29 by means of an internal seam 30 interconnecting the elements 21, 22.

Two tethers 31, 32 are provided on the interior of the air-bag 20. Again each tether 31, 32 is such that the length of the tether extending between points of the leading edge 24 and the trailing edge 25, where the tether is connected to the fabric elements 21, 22, is less than the width of each of the fabric elements 21, 22 between said points. Again the purpose of the tethers 31, 32 is to ensure that the air-bag has an appropriate configuration when it is inflated, in a generally similar manner to the embodiment of FIGS. 1 and 2.

The two tethers 31, 32 of the embodiment of FIG. 3 can either be configured to be of equal length to one another or such that they are of unequal lengths (as illustrated in FIG. 3). By varying the relative lengths of the two tethers 31, 32, different inflation characteristics can be imparted to the air-bag 20.

Figure 4:
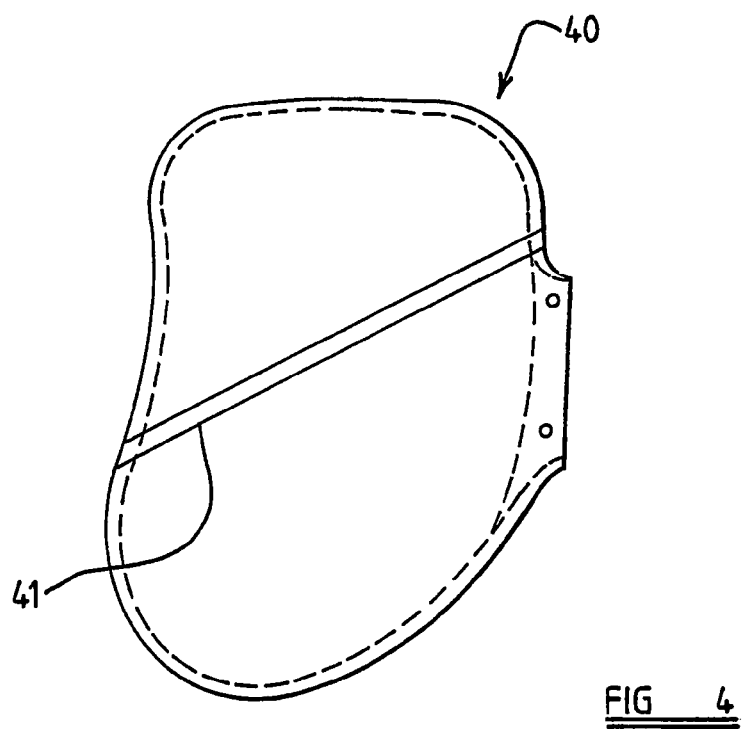
FIG. 4 is a view of a modified air-bag similar to that shown in FIG. 2.

FIG. 4 shows an air-bag 40 which is similar to the air-bag shown n FIG. 2, the air-bag being provided with an internal tether 41 which extends diagonally from the forward or leading edge to the trailing edge. In this embodiment, although the tether 41 may have a length which is greater than the width of the air-bag, measured horizontally, nevertheless, the length of the tether between the end parts when connected, respectively, to the leading edge and the trailing edge of the air-bag is less than the width of each of the two layers forming the air-bag extending between the two connections. Again the fabric of the air-bag is initially wrinkled or folded due to the fact that the length of the tether between the connections is less than the length of the fabric elements between the connections.

In each of the above-described embodiments, it is to be appreciated that the or each tether is only connected to the fabric elements of the air-bag at opposed ends of the tether, so that, when the air-bag is inflated, the tether extends across the interior of the air-bag.

Whilst the invention has been described with reference to embodiments in which the tethers are connected to the air-bag by having parts of the tether trapped between superimposed elements of fabric or the like which are then secured by stitching, with the stitching "trapping" the ends of the tethers, the tethers could be held in position in other ways, for example by using an adhesive.

While the above description constitutes the preferred embodiment of the present invention, it will be appreciated that the invention is susceptible to modification, variation and change without departing from the proper scope and fair meaning of the accompanying claims.

The invention claimed is:

1. A side air-bag for use in a motor vehicle, the side air-bag comprising two superimposed layers of a laminar material, each layer having a leading edge and a trailing edge, there being at least one tether having a laminar form and being disposed between the two layers, the tether having opposed ends including a forward end, which is connected to the leading edges of the two layers, and a rearward end, which is connected to the trailing edges of the two layers, the laminar form along the forward end of the tether is positioned between and substantially parallel to the leading edges of the two layers and the laminar form along the rearward end of the tether is positioned between and substantially parallel to the trailing edges of the two layers, the length of the tether between the connections being less than the width of the layers forming the air-bag between the connections causing the layers to have some wrinkles or folds between the leading and trailing edges when the airbag is uninflated and the tether is in a flattened condition, the air-bag is configured to be mounted in the motor vehicle and to be deployed in a deployment direction that is substantially parallel to a longitudinal axis (X) of the motor vehicle, and wherein during deployment of the air-bag the tether extends between the leading and trailing edges to limit movement of the leading edges in the deployment direction and the laminar form of the tether is positioned along a plane substantially perpendicular to a lateral axis (Y) of the motor vehicle, forcing expansion of the air-bag in a direction substantially parallel to the lateral axis (Y).

2. A side air-bag according to claim 1 wherein there is a single tether.

3. A side air-bag according to claim 1 wherein there are at least two tethers at spaced apart positions.

4. An air-bag according to claim 1 wherein the air-bag is divided into two separate internal inflatable chambers by means of a seam interconnecting the layers of laminar material.

5. An air-bag according to claim 1 wherein the width of each layer of laminar material at the point where the tether is provided is W and the length of the or each tether is d, wherein $d < 2 W/\pi$.

6. An air-bag according to claim 1 wherein one of the opposed ends of the tether is sewn to the leading edges of the layers of the air-bag.

7. An air-bag according to claim 6 wherein the two layers are sewn together by a peripheral seam, and the peripheral seam forms the connections of the opposed ends of the tether to the leading and trailing edges.

8. An air-bag according to claim 1 wherein the wrinkles or the folds are formed in an area of the layers proximate the tether.

* * * * *